United States Patent [19]
Schulte

[11] Patent Number: 5,217,044

[45] Date of Patent: Jun. 8, 1993

[54] FLEXIBLE SUCTION PIPE

[75] Inventor: Daniel L. Schulte, Derby, Kans.

[73] Assignee: Great Palins Industries, Inc., Wichita, Kans.

[21] Appl. No.: 791,425

[22] Filed: Nov. 13, 1991

[51] Int. Cl.⁵ .............................................. F17D 1/08
[52] U.S. Cl. ..................................... 137/590; 137/565
[58] Field of Search ............... 137/590, 592, 615, 565, 137/589; 222/318, 383

[56] References Cited

U.S. PATENT DOCUMENTS

| | | | |
|---|---|---|---|
| 3,017,898 | 1/1962 | Hobson | 137/590 |
| 3,631,880 | 1/1972 | Hansel | 137/172 |
| 3,674,179 | 7/1972 | Galloway | 222/94 |
| 4,114,783 | 9/1978 | Wempe et al. | 137/590 X |
| 4,248,261 | 2/1981 | Carlson | 137/590 |
| 4,510,968 | 4/1985 | Rau | 137/590 |
| 4,856,683 | 8/1989 | Beaston | 222/318 |

Primary Examiner—Martin P. Schwadron
Assistant Examiner—Kevin L. Lee
Attorney, Agent, or Firm—Lawrence E. Evans, Jr.

[57] ABSTRACT

Agricultural chemicals, such as herbicides, pesticides and fertilizers, are typically sold as a liquid concentrate and are transported in plastic tanks which commonly range from 15-160 gallons in size. Often these tanks are manufactured using conventional rotational molding techniques from a thermoplastic such as high density polyethylene (HDPE). When full of liquid these tanks are heavy and are typically moved using a forklift or other suitable powered apparatus. The bottoms of these tanks flex up and down when full and further vary in size due to manufacturing variances and the physical properties of the plastic itself. The flexible suction pipe is typically installed in one of these tanks and is designed to keep the inlet of the suction pipe at or near the bottom of the tank despite flexing and other variables to maximize withdrawal of fluid from the tank. The flexible suction pipe includes an elongate flexible bellows which expands and contracts as the situation may demand.

14 Claims, 9 Drawing Sheets

FIG.9

# FLEXIBLE SUCTION PIPE

BACKGROUND OF THE INVENTION

1. Field of the Invention

The flexible suction pipe is installed through the bunghole in a tank and is positioned on the interior of the tank, with the inlet port of the suction pipe located at or near the bottom of the tank. In most circumstances, the flexible suction pipe connects to an adapter which is mounted in the bunghole of the tank. A pump is mounted on the exterior of the tank in fluid communication with the flexible suction pipe and the adapter. The flexible suction pipe allows the pump to withdraw substantially all of the fluid from the tank.

2. Description of the Prior Art

In the agricultural chemical business, tanks are typically manufactured using conventional rotational molding techniques from corrosion resistant thermoplastics such as high density polyethylene (HDPE). The position of the bottom of such tanks varies due to several factors. Those skilled in the art recognize that the tolerances of such tanks vary as much as plus or minus ½ inch, due to the limitations of rotational molding techniques and the physical properties of thermoplastics. When full of liquid, the bottom of the tank tends to flex outwardly approximately ½ inch. If mishandled, the bottom of a tank could be flexed inward by a forklift or other lifting means as much as 2 inches. Combining all of these factors together, the exact position of the bottom of the tank can vary approximately 2½ inches up or approximately 1 inch down. Although this seems like a trifle, it is important in the design of suction pipes. [½" variance due to manufacturing tolerances (slightly undersize tank) +2" deflection due to mishandling =2½" possible variance up]. [½" variance due to manufacturing tolerances (slightly oversize tank) +½" outward flex due to heavy fluid =1" possible variance down]. The term up, as used herein, means a movement of the bottom towards the interior of the tank; the term up is synonymous with the term inward. The term down, as used herein, means a movement of the bottom away from the interior of the tank; the term down is synonymous with the term outward.

The optimum design for a suction pipe dictates that the inlet of the suction pipe be located as close as possible to the bottom of a tank so that the pump can withdraw substantially all of the fluid from the tank. Unfortunately, the bottom of the tank is not always located an exact distance from the bunghole in the top of the tank. This complicates the design of suction pipes. Applicant believes that the actual position of the bottom of a tank typically used with agricultural chemicals can vary as much as 3½ inches (2½" up +1" down =3½" possible variance). Because of these possible variances, the overall length of the suction pipe and the location of the inlet ar critical design considerations.

To accommodate for these variances, three different types of suction pipes have been developed for use in the agricultural chemical business. The first type of suction pipe is a rigid elongate one piece conduit which extends below the bung adapter into the tank. Because tanks come in various sizes, the length of the rigid conduit must vary. This leaves a manufacturer with two alternatives.

The first alternative is a standard length rigid one piece pipe designed to be located at or near the bottom of a tank per the specifications of the tank manufacturer. Unfortunately, the actual tank may vary somewhat from the specification. If the tank is a little small, the one piece suction pipe may not fit, so the manufacturer intentionally designs it to be a little short of the anticipated bottom of the tank. If the tank is mishandled, the bottom flexes inward and can hit the one piece rigid suction pipe causing it to snap off or shear at the bunghole adapter. If this happens, the entire system fails and the suction pipe must be replaced. To prevent a total failure of the system, the suction pipe designer makes the pipe even shorter. This minimum length suction pipe leaves a gap between the inlet of the suction pipe and the bottom of the tank. In tanks which are slightly oversize due to manufacturing variances, the gap is increased. When an oversize tank flexes downward, the gap is more pronounced. The larger the gap, the greater the amount of fluid that will be left in the tank.

The designer of a one piece rigid suction pipe is placed on the horns of a dilemma. Either a short design is chosen which seldom snaps off or an average length is chosen which has a greater probability of being snapped off due to compressive loading forces.

The other alternative for a rigid one piece design is to custom cut the length of each suction pipe for each separate tank. This is expensive and impractical for high volume, low cost production and can only address manufacturing variances. Tanks containing corrosive agricultural chemicals range in size from approximately 15 gallons to 160 gallons. When these tanks are full of fluid the weight of the fluid makes it necessary to use a forklift, chain hoist or some other mechanical means to move the tanks around. During the lifting process, the fork may be improperly placed causing approximately 2 inches of inward deformation of the bottom of a tank. Mishandling of tanks in this manner is a common cause of suction pipe failure, even if it is custom cut to length for that individual tank The overall length of the present invention is flexible, due to the bellows construction, which allows the inlet of the suction pipe to be positioned at or near the bottom of the tank despite flexing, manufacturing variances, and mishandling. The present invention is much less prone to being snapped off or sheared when compared to a rigid one piece type suction pipe.

The second type of suction pipe commonly used with agricultural chemicals is a two piece telescoping apparatus, typically manufactured from two separate pieces of rigid plastic conduit having different diameters. Because the pump is placing negative pressure on the interior of the suction pipe, the two telescoping members have to fit tightly together or air will bypass through the annular gap. The telescoping suction pipe can be initially installed with the bottom telescoping member touching the bottom of the tank. If the tank is mishandled while being moved about, the overall length of the telescoping suction tube is shortened and the apparatus does not break. However, when the bottom of the tank flexes back down, there will be a gap between the inlet of the telescoping suction pipe and the bottom of the tank. This gap prevents the pump from fully emptying the tank. Obviously, the larger the gap the greater the amount of fluid that will be left in the tank. In the industry, telescoping suction pipes are generally thought to be an advancement over a rigid one piece suction pipe because they generally do not break off inside the tank. However, a telescoping suction pipe can only move in one direction. It can contract in overall length, but it cannot, without manual assistance, expand or return to its original length. The present invention is an improvement over the telescoping suction pipe because it can move in two directions without manual assistance due to the flexible bellows. This allows the inlet port of the flexible suction pipe to be located at or near the bottom of a tank at all times.

From the end user's point of view, it is desirable to remove as much fluid from the interior of the tank as practically possible. In some circumstances, a farmer will go to an agricultural chemical dealer and will purchase, for example, sixty gallons of a concentrated agricultural chemical. The plastic tank, the suction pipe, and the pump are owned by the agricultural chemical dealer and are merely loaned to the farmer. The farmer picks up the tank and takes it to his field to transfer the chemical to a tractor o other implement for application to his field or crops. When the tank is empty, the farmer returns the tank, pump and suction pipe to the agricultural chemical dealer for reuse by others. If there are two or three gallons of the chemical sloshing around in the bottom of the tank that the farmer cannot pump out, he feels that he has paid for a product which was not delivered. The cost of concentrated agricultural chemicals can range from $10.00 to $300.00 per gallon (1991 prices). It is therefore important from the farmer's point of view to be able to substantially empty the tank.

If the farmer attempts to obtain a refund for the chemical which is left in the bottom of the tank, there is always a question as to exactly how much chemical is sloshing around inside. Furthermore, a refund situation creates more paper work and hassle for the parties. It is therefore highly desirable to design a suction pipe which will, to the extent practically possible, empty the tank.

The third type of suction pipe used in the agricultural chemical industry is a multi-piece spring loaded telescoping suction pipe which allows the bottom of the suction pipe to travel up and down during movement of the bottom of the tank and to adjust its length for manufacturing variances in tank size The spring in the apparatus causes the bottom of the suction pipe to be urged into contact or near proximity with the bottom of the tank, to the limit of the mechanical stroke of the telescoping member. The spring loaded suction pipe attempts to eliminate or at least minimize the ga between the bottom of the suction pipe and the bottom of the tank. These spring loaded telescoping suction pipes are relatively expensive to manufacture because of the multi-piece construction. The metal spring is exposed to corrosive agricultural chemicals. In most cases, these spring loaded telescoping suction pipes have a short stroke which is insufficient to always maintain contact with the bottom of the tank. For example, the total stoke (from full up to full down) of the Science multi-piece spring loaded telescoping suction pipe is believed to be less than 1½ inches. Applicant believes that the total movement in the bottom of a tank can be as much as 3½ inches up and down, as discussed above.

There has been a long felt need in the agricultural chemical business to develop an inexpensive suction pipe which stays on the bottom of the tank, is resistant to being snapped off and which does not contain corrosive components.

Several prior art patents, including U.S. Pat. No. 3,017,898 and No. 4,510,968 disclose a conical bellows for use with a multi-piece suction pipe as discussed in the Information Disclosure Statement filed concurrently herewith.

SUMMARY OF THE INVENTION

The flexible suction pipe can be manufactured as an integral unit or it can be manufactured as a multi-piece apparatus. The integral unit is typically manufactured using conventional blow molding techniques from a non-corrosive thermoplastic such as HDPE. The flexible bellows can expand and contract, without manual intervention, allowing the bottom of the suction pipe to travel up and down during movement of the bottom of the tank. The ability to travel up and down, without manual intervention, allows the bottom of the flexible suction pipe to always be in contact with the bottom of the tank. When the bottom of the suction pipe is in contact with the bottom of the tank, the pump can withdraw substantially all of the fluid from the tank which is desirable in agricultural applications. The blow molding process is an economical method to mass produce the bellows suction pipe. Because the bellows is able to contract in overall length, the possibility of being snapped off, like a rigid suction pipe, is minimized.

So that the manner in which the above recited features, advantages and objects of the present invention are attained and can be understood in detail, more particular description of the invention, briefly summarized above, may be had by reference to the embodiments thereof which are illustrated in the appended drawings.

It is noted, however, that the appended drawings illustrate only typical embodiments of this invention and are therefore not to be considered limiting of its scope, for the invention may admit to other equally effective embodiments.

DESCRIPTION OF THE PREFERRED EMBODIMENT

Figure 1:
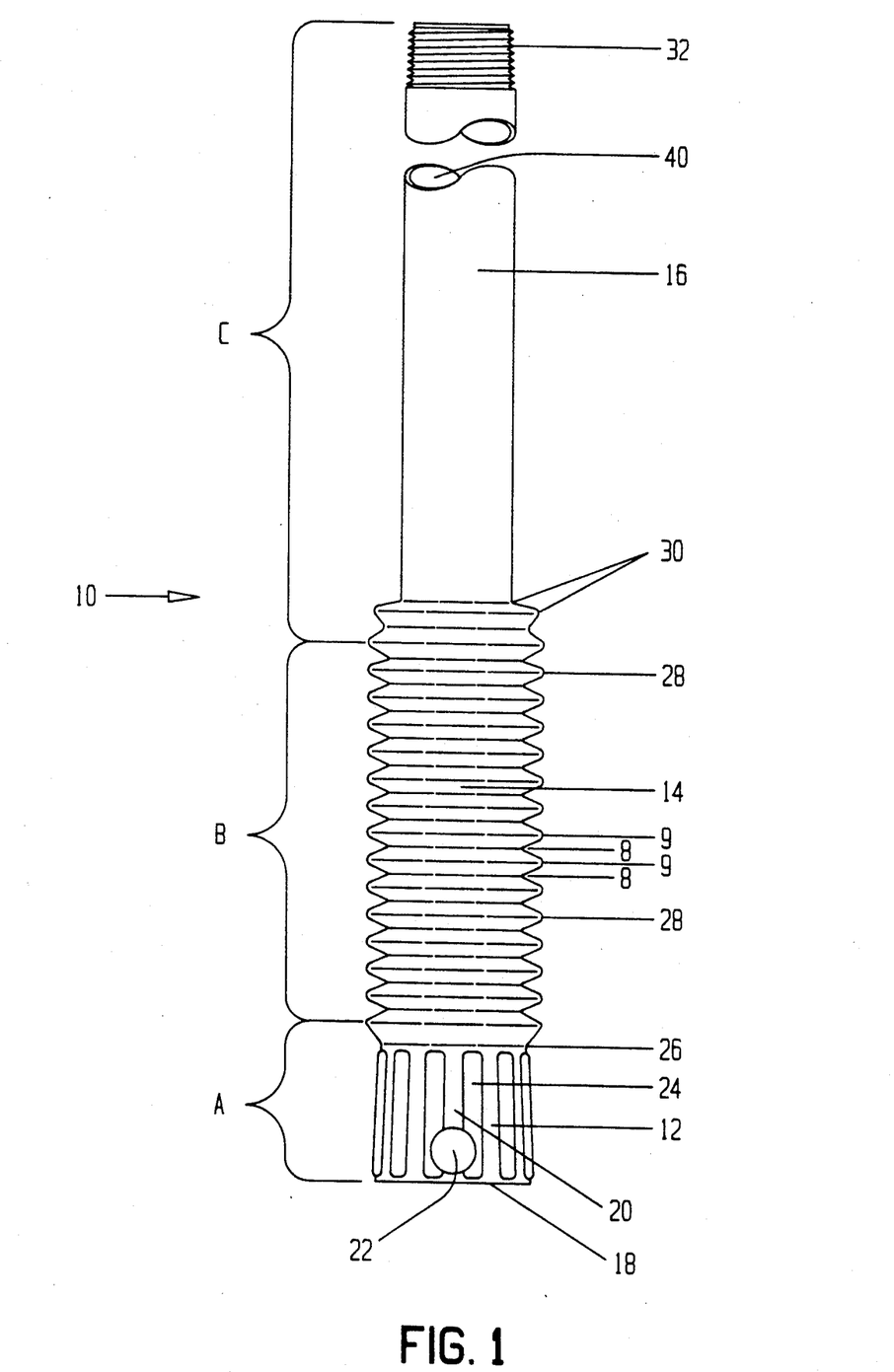
FIG. 1 is a side elevation view of the integral flexible suction pipe.

Referring to FIG. 1, the integral flexible suction pipe is generally identified by the numeral 10 and includes three primary components as follows: a hollow foot 12, a hollow elongate flexible bellows 14 and a rigid elongate conduit 16. The overall length of the integral flexible suction pipe 10 will vary depending on the tank size. The foot 12 includes a flat circular disc shaped member 18. The flat disc shaped member 18 is sometimes referred to as the bottom of the suction pipe 10.

Figure 3:
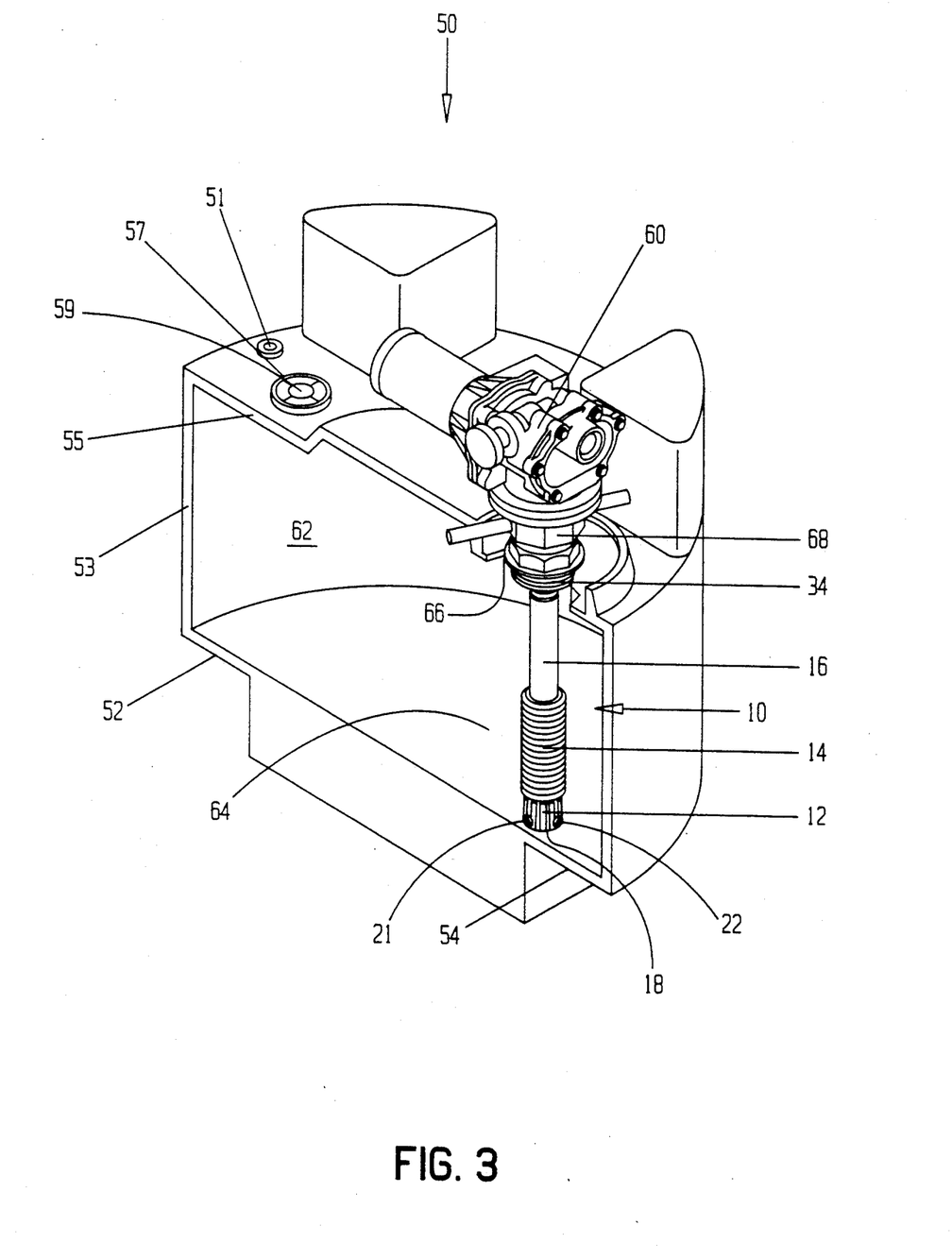
FIG. 3 is a partial cut away view of a tank with the integral flexible suction pipe mounted therein. A pump is mounted to an adapter on the exterior of the tank.

In one embodiment designed to fit in the 15 gallon tank shown in FIG. 3, the length of the foot 12 is approximately 2 inches as indicated by the bracket A. The length of the bellows 14 is approximately 5 inches as indicated by the bracket B. The length of the conduit 16 is approximately 8 inches as indicated by the bracket C. The inside diameter of the conduit 16 is nominally 1 inch. The overall length of the flexible suction pipe 10, in this particular embodiment, is the sum of A, B, and C, which is approximately 15 inches. The maximum overall diameter of the suction pipe 10 is less than 2⅜ inches to facilitate installation through a "2 inch bunghole", as discussed hereinafter. Those skilled in the art recognize that the length of these various components will vary depending on the size of different tanks.

In the barrel and tank industry, a standard bunghole is commonly referred to as having a 2 inch diameter. In fact, the industry has two standards with different thread forms. The 2¼ inch standard bunghole uses an NPS thread form. The 2½ inch standard bunghole uses a buttress thread form. For convenience, those in the tank and barrel industry generally refer to both of these standard bunghole sizes as a "2 inch bunghole". As used herein the term "2 inch bunghole" includes both the 2¼ inch standard size and the 2½ inch standard size.

A rigid elongate cylindrical member 20 extends upward from the outer circumference of the bottom 18. At least one inlet port 22 is formed in the foot 12. A plurality of elongate ribs 24 are arranged parallel to the longitudinal axis of the suction pipe 10 and protrude in an outward direction from the rigid elongate cylindrical member 20. The ribs 24 help to stiffen the foot to prevent deformation of the inlet port 22.

Those skilled in the art recognize that various equivalent structures can be substituted for the foot 12. For example, the bottom 18 could be eliminated. The height of the cylindrical member 20 could be reduced. The ribs 24 could be discarded. The foot could be nothing more than a rigid rim around the bottom of the bellows. The foot could be a plurality of small pedestals formed on the end of the bellows with the inlet port being the gap between the pedestals. Regardless of how the foot 12 is designed, to facilitate installation in a standard "2 inch bunghole" the largest overall dimension of the flexible suction pipe 10 must be less than 2¼ inches.

The neck 26 of the cylindrical member 20 connects to the bellows 14. The bellows 14 includes a plurality of accordion shaped elements 28 which can contract due to compressive loading forces and can expand due to memory in the thermoplastic. The shoulder 30 of the conduit 16 connects to the bellows 14. The neck 32 of the conduit 16 is threaded to engage a bunghole adapter 34 or the pump itself. The bellows 14 is formed in a series of parallel convolutions defining peaks 9 and valleys 8. The bellows 14, in the preferred embodiment, has a total of 14 peaks and 15 valleys between the neck 26 of the foot 12 and the shoulder 30 of the bellows 14. Those skilled in the art will recognize that the number of peaks and valleys can vary due to material choices, tank size and other manufacturing considerations. The foot 12, the bellows 14 and the conduit 16 define an interior passageway 40 which allows fluid to enter the inlet 22 and pass through the hollow suction pipe 10.

Figure 2:
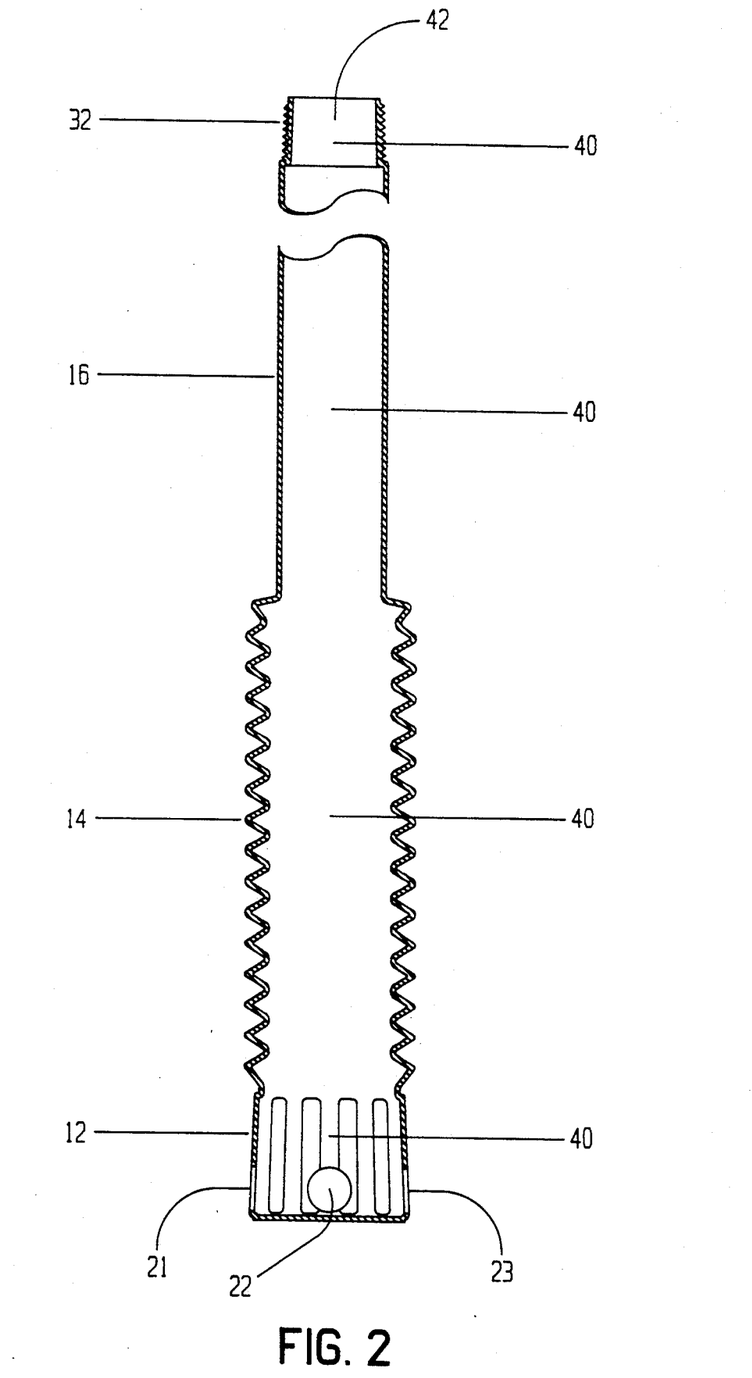
FIG. 2 is a section view of the integral flexible suction pipe of FIG. 1.

FIG. 2 is a section view of the integral suction pipe 10. The interior passageway 40 allows fluid communication from the inlet port 22 to the outlet port 42 of the hollow integral suction pipe 10. Other inlet ports 21 and 23 can be formed in the foot 12.

Applicant has tested alternative longitudinal arrangements of the foot 12, the bellows 14 and the conduit 16. It is possible to rearrange the longitudinal position of these elements, with the foot 12 on the bottom, the conduit 16 in the middle and the bellows 14 on the top. However, Applicant believes that the best mode is shown in FIG. 2. Alternative longitudinal arrangements of the foot 12, bellows 14 and conduit 16 are within the scope of this invention.

FIG. 3 shows a partial cut away view of a tank generally identified by the numeral 50. This particular tank holds approximately 15 gallons of fluid and has an overall height of approximately 22 inches and a diameter of approximately 22 inches. When the tank is filled with 15 gallons of liquid it weighs approximately 150 pounds including the pump 60, the adapter 34 and the flexible suction pipe 10. The tank is typically rotational molded using conventional techniques from non-corrosive materials, such as HDPE. Examples of corrosive agricultural chemicals which may be placed in the tank 50 are Supercide brand herbicide by Ciba Geigy; Gramoxone brand herbicide by ICI Americas; and Prep brand herbicide by Rhone-Poulenc. Two notches 52 and 54 are formed on the bottom of the tank 50 to facilitate movement of the tank by a forklift.

The tank 50 defines an interior chamber 62 which receives the flexible suction pipe 10. The bottom 64 of the interior chamber 62 is a relatively flat surface which can flex down approximately ½ inch due to the weight of the fluid. Manufacturing variances account for fluctuation in size as much as plus or minus ½ inch. Mishandling can deform the bottom of the tank approximately 2 inches inward. Applicant believes that the bottom 64 of the tank can move up a total of 2½ inches and down a total of 1 inch for a total stroke of approximately 3½ inches. The foot 12 of the suction pipe 10 is designed to be resting on the bottom 14 of the tank 50 regardless of where the bottom moves. The tank 50 also includes sidewalls 53 and a top 55. A vent hole 51 and a fill port 57 are formed in the top 55. A plug 59 seals the fill port 57.

A standard "2 inch bunghole" 66 is formed in the top 55 of the tank 50. The adapter 34 screws into the threaded bunghole 66. The neck 32 of the flexible suction pipe 10 threadeably engages the inlet port 33 of the adapter 34. A mounting lug 68 threadeably engages the top neck 71 of the adapter 34. In most circumstances, an adapter is threaded into the bunghole and the suction pipe 10 is left in place in each tank. From time to time, the end user may have several full tanks at a given location and wish to discharge the fluid from each tank. In this situation with several full tanks, the end user typically will empty the first tank, remove the pump and install it on an adapter in the second tank. When the second tank is empty, the end user will remove the pump and install it on an adapter in the third tank. This practice necessitates one suction pipe dedicated to each tank. This practice is used to avoid lifting the adapter and suction pipe from one tank to another and dripping corrosive agricultural chemicals during the transition from one tank to the next.

In an alternative embodiment, it would be possible to design a pump which directly receives the suction pipe and has an integral adapter for engaging the bunghole 66. This alternative arrangement is within the scope of this invention, though it is not recommended because of the drip problem which would be occasioned when the pump and suction pipe are moved from one tank to the next. Use of an adapter and dedicated suction pipe in each tank is believed to be the best mode.

After the flexible suction pipe 10 has been blow molded, the approximate overall length of one embodiment shown in this Figure is 15 inches. The combined length of the bellows 14 and the foot 12 is 7 inches. This portion of the suction pipe 10 is identified by the brackets A and B in FIG. 1. Prior to installation of the flexible suction pipe 10 into the tank 50, the bellows 14 is fully compressed for approximately one minute. The length of the bellows 14 and the foot 12 at full compression is approximately 3 inches. After the initial compression the bellows 14 and the foot 12 are released and return to an approximate length of 6 inches due to the memory in the HDPE.

When installing the flexible suction pipe 10 in the tank 50, the bellows 14 is preloaded or compressed approximately 1 inch so that the total height of the bellows 14 and the foot 12 when installed in the tank 50 is approximately 5 inches. This allows the flexible suction pipe 10 to have a maximum upward stroke of approximately 2 inches and a maximum downward stroke of approximately 1 inch for an overall stroke of 3 inches. The prior art spring loaded telescoping suction pipes are believed to have a total stroke of less than 1½ inches.

Figure 4:
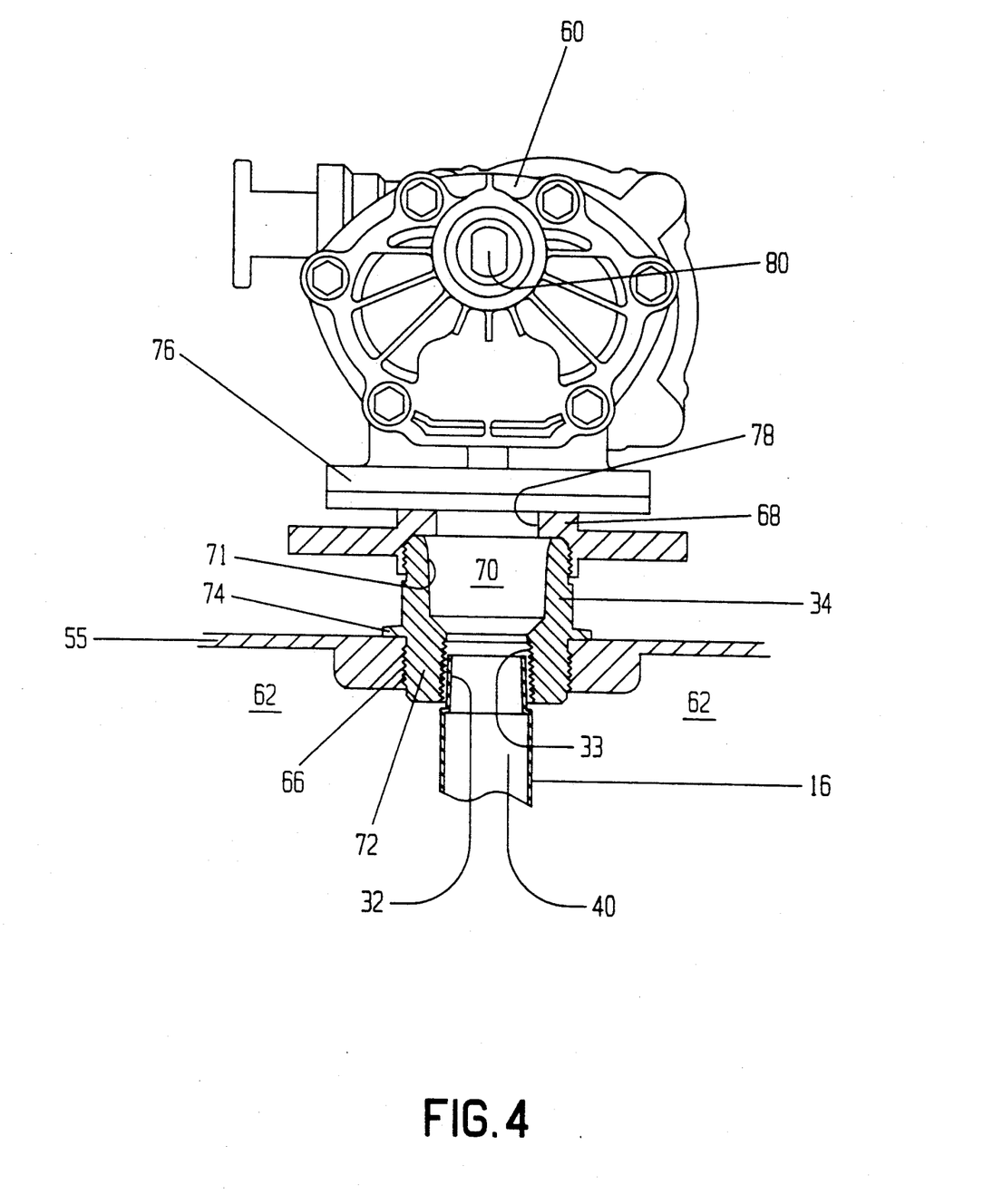
FIG. 4 is a perspective view of the pump and a section view of the adapter, the bunghole and the top of the integral flexible suction pipe of FIG. 3.

FIG. 4 is a perspective view of the pump 60 and a section view of the mounting lug 68, the adapter 34 and the bunghole 66. The adapter 34 defines a central bore 70 which permits fluid communication between the pump 60 and the suction pipe 10.

The adapter 34 includes an upward projecting neck 71 which threadeably engages the mounted lug 68. The adapter 34 also includes a downwardly projecting neck 72 which threadeably engages the bunghole 66. A radial shoulder 74 protrudes outwardly from the center of the adapter 34 and engages the top 55 of the tank 50 when the adapter 34 is threaded into the bunghole 66. The rigid conduit 16 has a threaded neck 32 formed on the top thereof. The neck 32 threadeably engages the inlet 33 of the vent hole 34. The pump 60 includes a mounting flange 76 which is secured by suitable fastening mean to the mounted lug 68.

The fluid flow path is as follows: fluid passes from the interior chamber 62 of the tank 50, through the inlet port 22 of the suction pipe 10, through the interior passageway 40, through the central bore 70 of the bung adapter 34, through the central bore 78 of the mounting lug 68 and into the pump 60. The fluid exits the pump 60 through the outlet port 80 which is typically connected to a flexible hose with a on/off dispensing nozzle on the end thereof. The tank 50 is vented through the aperture 51 so that a vacuum is not created in the chamber 62 when fluid is being pumped out of the tank 50.

Figure 5:
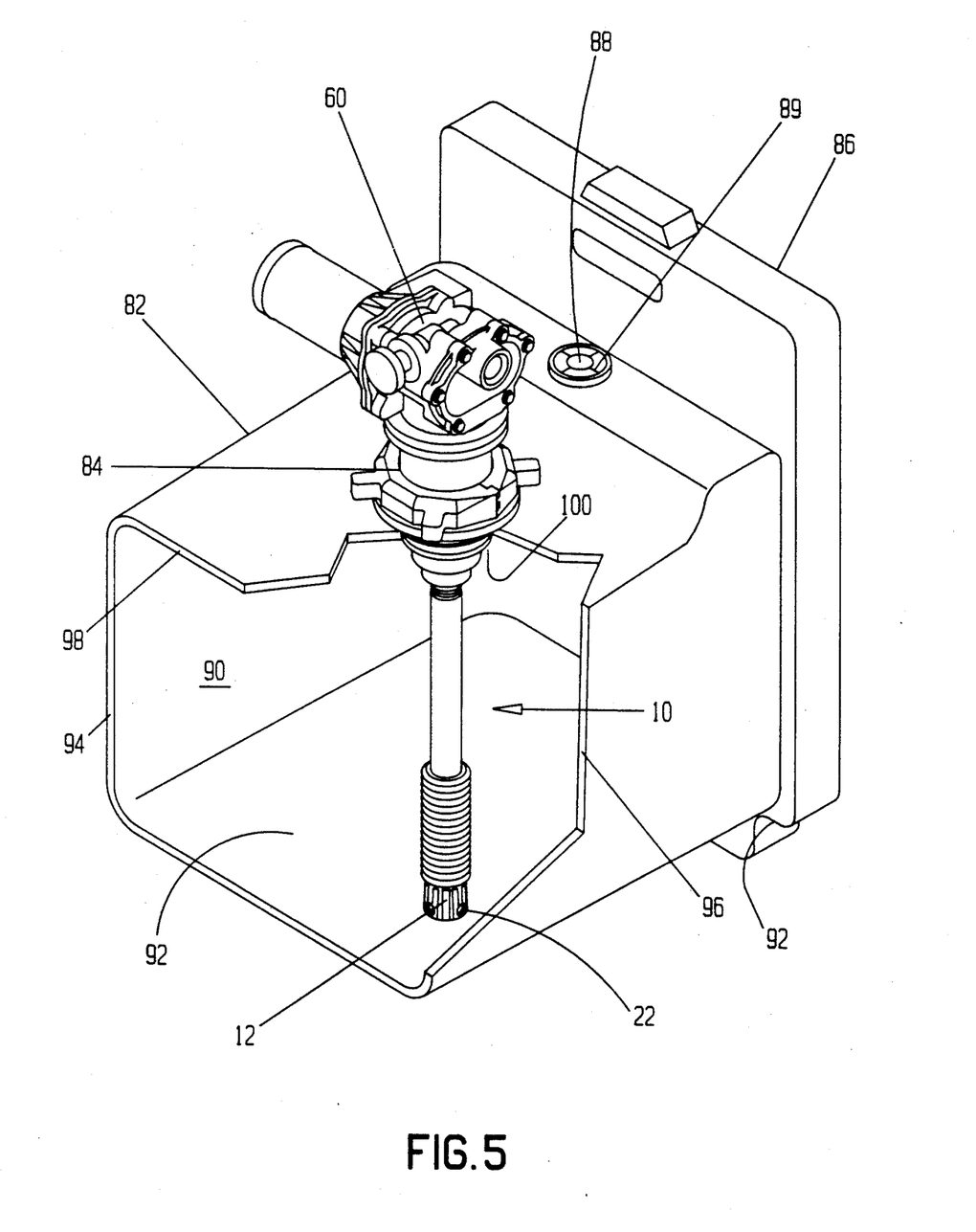
FIG. 5 is a partial cutaway view of another tank with the integral flexible suction pipe mounted therein. The pump is mounted on a different type of adapter on the exterior of this tank. This alternative adapter allows the pump to recirculate fluid inside the tank.

FIG. 5 shows a partial cutaway view of a different tank 82. It holds approximately 60 gallons of liquid and when full weighs approximately 600 pounds including the pump 60, the adapter 84 and the flexible suction pipe 10. This tank is approximately 38 inches long, 32 inches tall and approximately 24 inches deep. In this particular tank, the overall length of the integral suction pipe is approximately 19 inches. The conduit 16 is approximately 12 inches long, the bellows 14 is approximately 5 inches long and the foot 12 is approximately 2 inches long. For manufacturing convenience, the Applicant recommends that the length of the foot 12 and the bellows 14 be held constant and that the length of the conduit 16 be varied to accommodate different sized tanks. The blow molding technique is thought to be limited to a device which is less than 30 inches in overall length. If a longer suction pipe is needed, such as that shown in FIG. 8, a multi-piece suction pipe can be used. If manufacturing techniques improve or if alternative techniques become available a multi-piece suction pipe may not be necessary.

The tank 82 is designed to be stackable one o top of another with the pump 60 in place. To accomplish this stacking function, an end piece 86 is positioned on the end 87 of the tank 82. Another end piece, not shown in the drawings, is position on the opposing end of the tank 82. A fill hole 88 is positioned in the top 98 of the tank 82. A removable plug 89 is threaded in the fill hole 88.

The tank 82 defines a interior chamber 90 and includes a bottom 92, sidewalls 94 and 96, and a top 98. The foot 12 of the suction pipe 10 is designed to be in contact with the bottom 2 of the tank 82. A different type of adapter 84 is positioned in the bunghole 100 which permits the pump 60 to recirculate fluid within the tank. In order to achieve the recirculating function, the bunghole 100 has a nominal inside diameter of 4 inches. It is desirable to recirculate certain agricultural chemicals, for example Bicep brand herbicide by Ciba Geigy, prior to application of this herbicide to a field or crops.

The recirculating adapter 84 is similar in operation and structure to the apparatus shown in FIG. 3 of U.S. Pat. No. 4,856,683 which is incorporated herein by reference and which is owned by Great Plains Industries, Inc., the assignee of the present invention.

The shape of the tank 82 allows a forklift to be inserted underneath the bottom 92 to facilitate movement of the tank 82 as desired. Mishandling of the tank can cause the bottom to be deflected inward approximately 2 inches.

Figure 6:
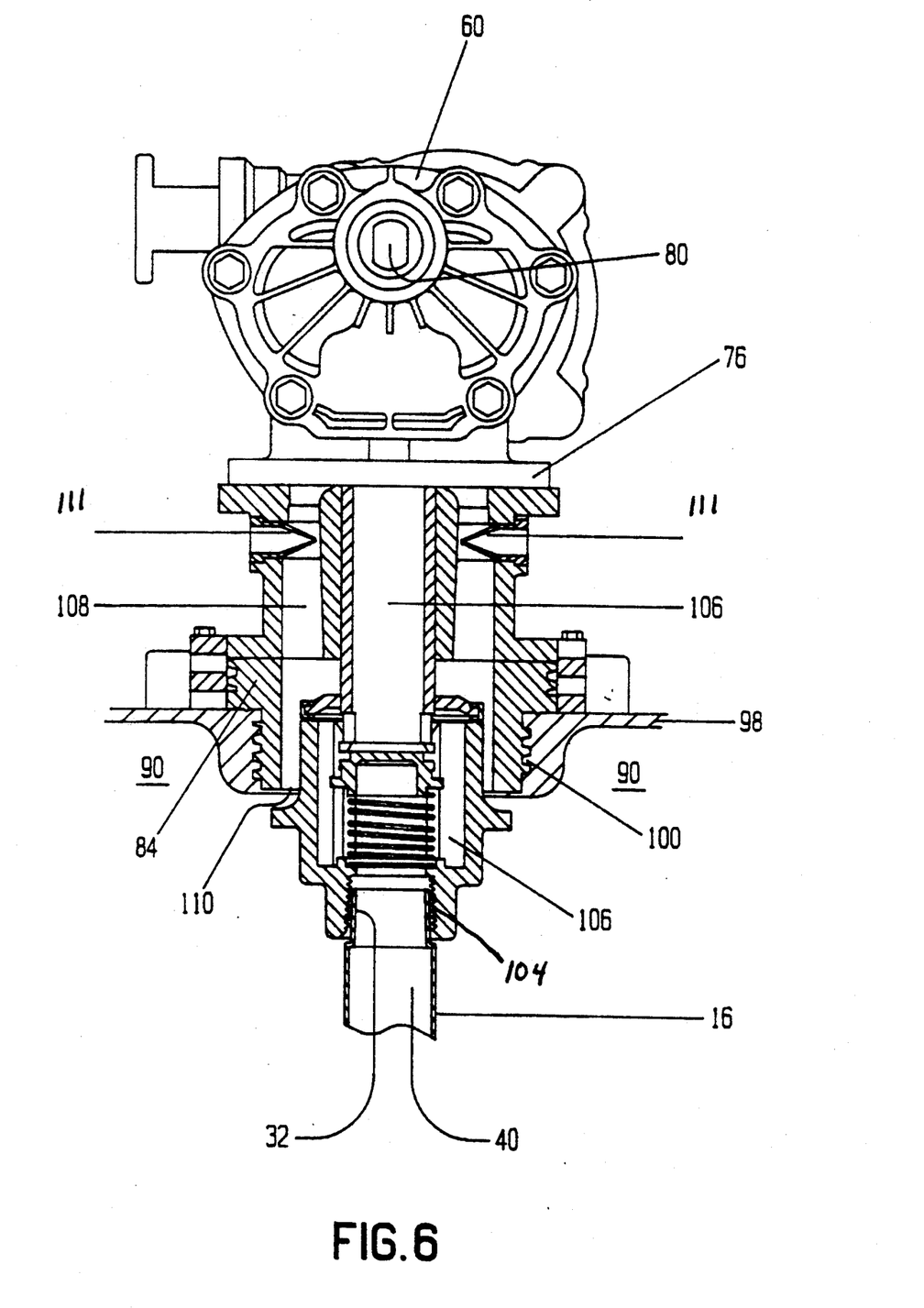
FIG. 6 is a perspective view of the pump and a section view of the adapter, the bunghole and the top of the integral flexible suction pipe of FIG. 5. This alternative adapter allows the pump to recirculate fluid inside the tank.

FIG. 6 is a perspective view of the pump 60 and a section view of the recirculating adapter 84 mounted in the 4 inch bunghole 100 of the tank 82. The recirculating adapter 84 includes an inlet port 104 which threadeably engages the neck 32 of the conduit 16. The recirculating adapter 84 defines an interior inlet passageway 106 which leads to the inlet of the pump 60. The recirculating adapter 84 also defines an interior discharge passageway 108 and an outlet port 110. Duck billed vent valves 111 connect with the discharge passageway 108 to vent the tank during discharge and prevent creation of a vacuum in the chamber 90.

When the pump 60 is in the recirculation mode, the flow path of the fluid is as follows: fluid passes from the interior chamber 90 of the tank 82 through the inlet port 22 and the interior passageway 40 of the suction pipe 10. The fluid passes through the inlet port 104 of the recirculating adapter 84 and through the interior inlet passageway 106. The fluid then enters the pump and passes through a bypass shunt, not shown in the drawings. The fluid is shunted in the pump to the interior discharge passageway 108 and thereafter exits the adapter 84 through the outlet port 110 and is returned to the interior chamber 90.

At the present time, Applicant is not aware of any adapter which will fit in a standard "2 inch bunghole" and permit recirculation of the fluid. To be able to recirculate, a larger adapter is required with special passageways which necessitates a 4 inch bunghole to accommodate the enlarged structure. The present invention is designed to facilitate installation through a standard "2 inch bunghole"; however, it can also be used with larger size bungholes.

Figure 7:
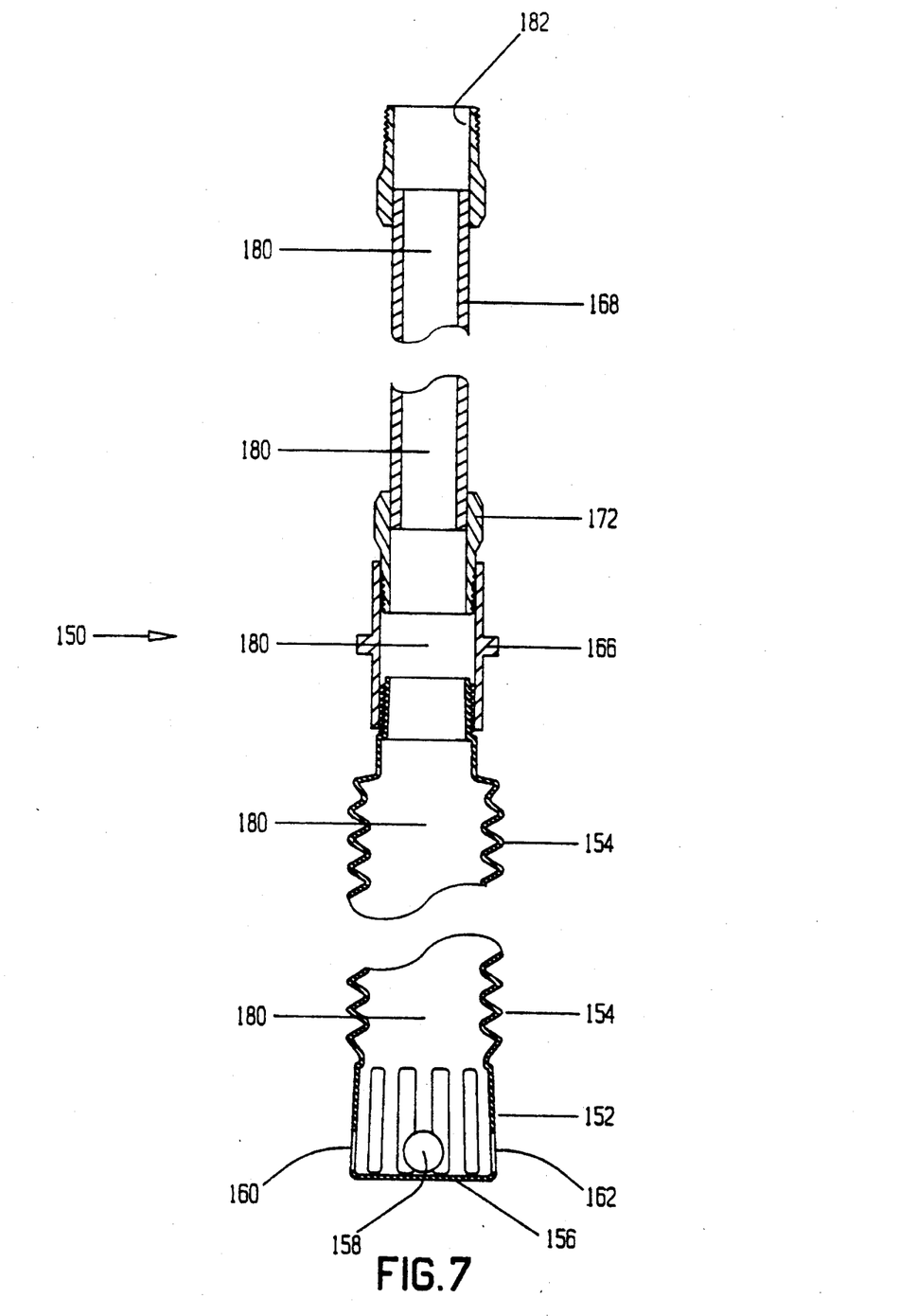
FIG. 7 is a section view of a multi-piece flexible suction pipe.

FIG. 7 shows an alternative embodiment of the flexible suction pipe which utilizes a multi-piece design and is generally identified by the numeral 150. A foot 152 is formed at the bottom of the suction pipe 150. Extending upward is a flexible bellows 154 constructed in a similar fashion as the bellows 14 in FIG. 1. The foot 152 includes a bottom 156 which is designed to touch the bottom of a tank. The foot 152 defines at least one inlet port 158. However, other inlet ports 160 and 162 can also be formed in the foot.

The neck of the bellows 164 is threaded and engages a connector 166. An elongate hollow conduit 168 is spin-welded to a top nipple 170 on one end and a bottom nipple 172 on the opposing end. The lower nipple 172 threadeably engages the upper portion of the connector 166. The foot 152, the bellows 154, the connector 166, the lower nipple 172, the conduit 168 and the upper nipple 170 together define an interior passageway 180. Fluid passes through the inlet port 158 and the interior passageway 180 and exits the outlet port 182.

Figure 8:
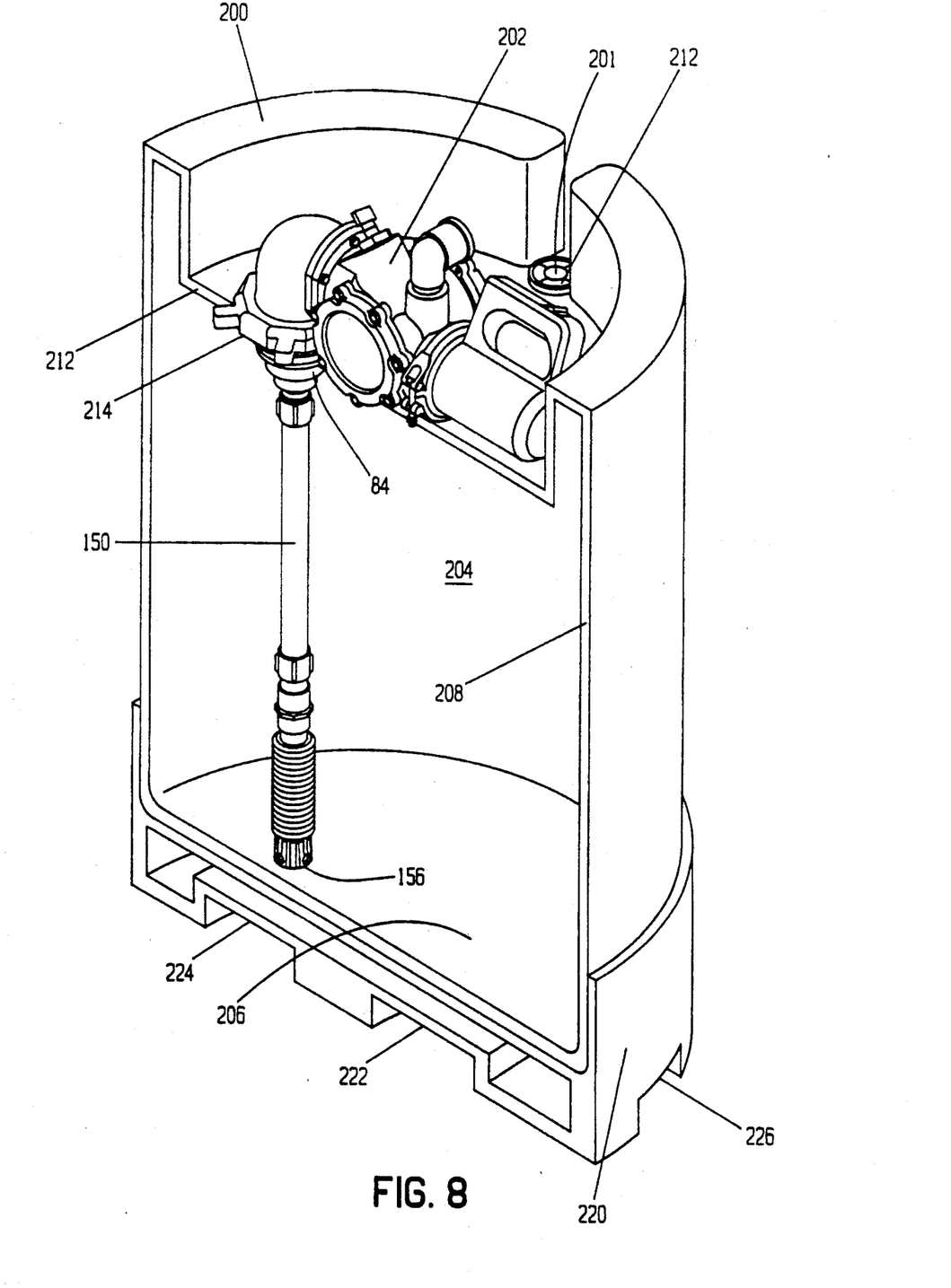
FIG. 8 is a partial cut away view of a third tank with a multi-piece flexible suction pipe mounted therein. A different type of pump is mounted on the recirculating adapter on the exterior of this tank. This alternative adapter allows the pump to recirculate fluid inside the tank.

FIG. 8 shows another tank 200 which is designed to hold approximately 110 gallons of liquid. When full of liquid, it weighs approximately 1,100 pounds including the pump 202, the adapter 84 and the multi-piece suction pipe 150. The tank 200 is approximately 48 inches tall, and approximately 36 inches in diameter.

The tank 200 defines an interior chamber 204 and includes a bottom 206, a cylindrical sidewall 208 and a top 212. A 4 inch bunghole 214 and a fill hole 201 are formed in the top 212 of the tank 200. A plug 203 seals the fill hole 201. A recirculating adapter 84 threadeably engages the bunghole 214 and receives the multi-piece suction pipe 150. The recirculating adapter 84 shown in this figure is substantially similar to the recirculating adapter 84 shown in FIG. 6.

A pallet 220 receives the tank 200. A first slot 222 and a second parallel slot 224 are formed in the pallet 220. These slots are aligned and are sized to receive a forklift to facilitate movement of the tank. Another slot 226 is formed in the pallet 220 at a right angle to the slots 222 and 224. A fourth slot, not shown in the drawings, is formed in the pallet 220 and is aligned parallel to the third slot 226. This facilitates access by a fork lift from several different directions depending on the orientation of the pallet 220. The bottom of the foot 156 is designed to be in contact with the bottom 206 of the tank 200 to facilitate removal of substantially all of the fluid from the tank.

Figure 9:
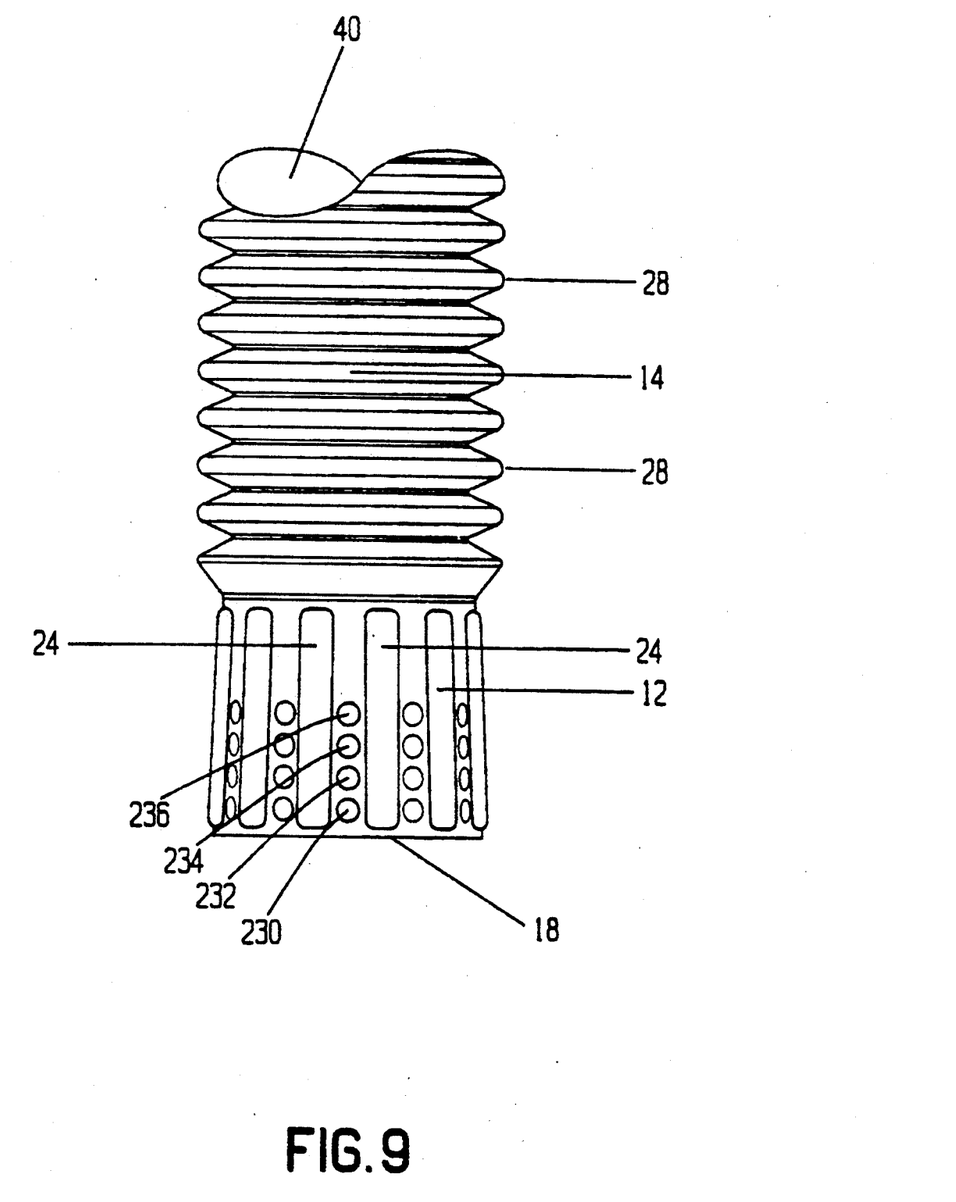
FIG. 9 is an alternative embodiment of the foot of the flexible suction pipe which has a plurality of small inlet holes which act as a screen.

FIG. 9 is a partial elevation view of an alternative embodiment of the inlet port 22 of FIG. 1. Instead of the large inlet port 22, a plurality of smaller inlet ports are formed in the foot 12. Smaller inlet ports are positioned in between the parallel ribs 24 and are aligned along the longitudinal axis of the suction pipe.

A first inlet port 230 is formed near the bottom 18 of the foot 12. Immediately above the first inlet port is a second port 232. Positioned immediately above the second port 232 is a third port 234 and a fourth port 236. These ports are arranged between the ribs 24 to prevent the foot 12 from being crushed due to the large plurality of holes and loading forces which may be exerted against the bottom 18. As previously discussed, the suction pipe is installed in a tank with a preload of approximately 1 inch of compression in the bellows 14 which causes the bottom 18 of the foot 12 to exert approximately 5 to 10 pounds of pressure against the bottom of the tank. Additional loading forces caused by mishandling of the tank can increase the force exerted by the bottom 18 of the foot 12 on the bottom of the tank to approximately 20 pounds. It is therefore desirable to design the foot in a rigid fashion to avoid deformation of the inlet ports but to design the suction pipe with a flexible length to avoid shearing of the pipe from the adapter. A series of four additional inlet ports are positioned between each of the ribs 24.

The plurality of small inlet ports in the foot 12 tend to act as a filter or screen to prevent unwanted particles from passing through the interior passageway 40 into the pump.

While the foregoing is directed to the preferred embodiment of the present invention, other and further embodiments of the invention may be devised without departing from the basic scope thereof, and the scope thereof is determined by the claims which follow.

What is claimed:

1. An elongate one piece suction pipe connected to a bung adapter for mounting inside a tank to facilitate withdrawal of corrosive agricultural fluids from the tank by a pump mounted on the adapter, the elongate suction pipe comprising:
  a. a rigid hollow foot contacting the bottom of the tank, said foot defining at least one inlet port;
  b. a flexible hollow elongate cylindrical bellows extending upward in relation to the bottom of the tank;
  c. a rigid elongate conduit extending upward in relation to the bottom of the tank;
  d. said hollow foot, said hollow bellows and said elongate conduit defining an interior passageway allowing fluid communication from the inside of the tank through said inlet port, through said interior passageway to the pump; and
  e. said elongate internal suction pipe has a nominal outside diameter less than 2½ inches, to allow installation in and removal from the tank through a bunghole; and
  f. said suction pipe is formed from one piece of material which is impervious to attack by the corrosive agricultural chemicals.

2. The apparatus of claim 1 wherein the one piece suction pipe is formed from HDPE and said cylindrical bellows is sized and dimensioned to deliver an overall stroke of approximately three inches.

3. The apparatus of claim 2 wherein said foot includes a flat disc shaped bottom member and a rigid elongate hollow cylindrical member, one end being joined to the circumference of said flat disc shaped bottom member.

4. The apparatus of claim 3 wherein said rigid elongate cylindrical member further includes a plurality of elongate ribs formed in the sidewall arranged parallel to the longitudinal axis of the elongate one piece suction pipe to reduce the possibility that said inlet port will be closed by deformation of said elongate cylindrical member.

5. The apparatus of claim 1 wherein said inlet port is a plurality of small apertures functioning as a screen to prevent debris from entering said passageway.

6. An elongate multi-piece suction pipe connected to a bung adapter, for mounting inside a tank to facilitate withdrawal of corrosive agricultural fluids from the tank by a pump mounted on the adapter, the elongate multi-piece suction pipe comprising:
   a. a rigid hollow foot contacting the bottom of the tank, said foot defining at least one inlet port;
   b. a flexible hollow elongate cylindrical bellows extending upward in relation to the bottom of the tank;
   c. a rigid elongate conduit extending upward in relation to the bottom of the tank;
   d. means for connecting said elongate flexible hollow cylindrical bellows to said rigid elongate conduit;
   e. said hollow foot, said flexible hollow cylindrical bellows, and said elongate conduit defining an interior passageway, allowing fluid communication from the inside of the tank through said inlet port, through said interior passageway to the pump;
   said elongate suction pipe has a nominal outside diameter less than 2½ inches to allow installation in and removal from the tank through a bunghole; and
   g. said cylindrical bellows and said elongate conduit are formed from a material impervious to attack by the corrosive agricultural chemicals.

7. The apparatus of claim 6 wherein said cylindrical bellows and said elongate conduits are formed from HDPE and said cylindrical bellows is sized and dimensioned to deliver an overall stroke of approximately three inches.

8. The apparatus of claim 7 wherein said foot includes a flat disc shaped bottom member and a rigid elongate hollow cylindrical member, one end being joined to the circumference of said flat disc shaped bottom member.

9. The apparatus of claim 8 wherein said rigid elongate cylindrical member further includes a plurality of elongate ribs formed in the sidewall and arranged parallel to the longitudinal axis of the elongate suction pipe to reduce the possibility that said inlet port will be closed by deformation of said elongate cylindrical member.

10. The apparatus of claim 6 wherein said inlet port is a plurality of small apertures functioning as a screen to prevent debris from entering said passageway.

11. An elongate multi-piece suction pipe, for mounting inside a tank to facilitate withdrawal of corrosive agricultural fluids from the tank; by a pump mounted on the outside of the tanks, the elongate multi-piece suction pipe comprising:
   a. a rigid hollow foot; said foot defining at least one inlet port;
   b. a flexible hollow elongate cylindrical bellows, extending upward in relation to the bottom of the tank;
   c. a rigid elongate conduit, extending upward in relation to the bottom of the tank;
   d. means for connecting said elongate flexible bellows to said rigid elongate conduit;
   e. said hollow foot, said hollow bellows, and said elongate conduit defining an interior passageway, allowing the fluid communication from the inside of the tank through said inlet port, through interior passageway to the pump;
   f. said cylindrical bellows and said elongate conduit are formed from a material which is impervious to attack by the corrosive agricultural chemicals;
   g. said elongate suction pipe has a nominal outside diameter of less than 2½ inches to facilitate installation in and removal from a bunghole; and
   h. said cylindrical bellows is sized and dimensioned to deliver an overall stroke of approximately three inches.

12. An elongated integral suction pipe connected to a bung adapter, for mounting inside a tank to facilitate withdrawal of fluid from the tank by a pump mounted on the adapter, the elongate integral suction pipe comprising:
   a. a rigid hollow foot, contacting the bottom of the tank; said foot defining at least one inlet port;
   b. a flexible hollow elongate cylindrical bellows, extending upward in relation to the bottom of the tank;
   c. a rigid elongate conduit, extending upward in relation to the bottom of the tank;
   d. said hollow foot, said hollow bellows, and said elongate conduit defining an interior passageway, allowing fluid communication from the inside of the tank through said inlet port, through said interior passageway to the pump;
   e. the elongate integral suction pipe is sized and arranged to allow installation of the tank through a 2-inch bunghole; said integral suction pipe is formed from a material which is impervious to attack by the corrosive agricultural chemicals; and
   f. said elongate internal suction pipe has a nominal outside diameter less that 2¼ inches;
   g. said foot includes a flat disc-shaped bottom member and a rigid elongate hollow cylindrical member; one end being joined to the circumference of said flat-disc-shaped bottom member; and
   h. said rigid elongate cylindrical member further includes a plurality of elongate ribs formed in the sidewall, arranged parallel to the longitudinal axis of the elongate integral suction pipe to reduce the possibility that said inlet port will be closed by deformation of said elongate cylindrical member.

13. An elongate multi-piece suction pipe connected to a bung adapter, for mounting inside a tank to facilitate withdrawal of fluid from the tank by a pump mounted on the adapter, the elongate multi-piece suction pipe comprising:
   a. a rigid hollow foot, contacting the bottom of the tank; said foot defining at least one inlet port;
   b. a flexible hollow elongate cylindrical bellow, extending upward in relation to the bottom of the tank;
   c. a rigid elongate conduit, extending upward in relation to the bottom of the tank;
   d. means for connecting said elongate flexible bellows to said rigid elongate conduit;
   e. said hollow foot, said hollow bellows, and said elongate conduit defining an interior passageway, allowing fluid communication from the inside of the tank through said inlet port, through said interior passageway to the pump;
   f. said elongate multi-piece suction pipe is sized and arranged to allow installation in the tank through a 2-inch bunghole;
   g. said elongate suction pipe has a nominal outside diameter less than 2¼ inches; and h. said rigid elongate cylindrical member further includes a plurality of the elongate ribs formed in the sidewall and arranged parallel to the longitudinal axis of the elongate integral suction pipe to reduce the possibility that said inlet will be closed by deformation of said elongate cylindrical member.

14. An elongate multi-piece suction pipe connected to a bung adapter, for mounting inside a tank to facilitate withdrawal of corrosive agricultural fluids from the tank by a pump mounted on the adapter, the elongate multi-piece suction pipe comprising:

a. a flexible hollow elongate bellows having convoluted side walls extending upward in relation to the bottom of the tank, the outer edge of said side walls being parallel to the longitudinal axis of said elongate multi-piece suction pipe;

b. a rigid hollow foot including a circular rim around the bottom of said flexible hollow bellows with protrusions extending from said rim and contacting the bottom of the tank;

c. a rigid elongate conduit, extending upward in relation to the bottom of the tank;

d. means for connecting said elongate flexible hollow bellows to said rigid elongate conduit;

e. said hollow foot, said flexible hollow bellows, and said elongate conduit defining an interior passageway, allowing fluid communication from the inside of the tank through said interior passageway to the pump;

f. said elongate multi-piece suction pipe has a nominal outside diameter less that 2½ inches to allow installation in and removal from the tank through a bunghold; and g. said flexible hollow bellows and said elongate conduit are formed from a material that is impervious to attack by the corrosive agricultural fluids.

* * * * *